Patented Oct. 12, 1954

2,691,646

UNITED STATES PATENT OFFICE 2,691,646

COPOLYMERS OF MULTIOLEFINS WITH VINYL ETHERS AND METHOD OF MAKING SAME

David W. Young, Roselle, and William J. Sparks, Westfield, N. J., assignors to Standard Oil Development Company, a corporation of Delaware No Drawing. Application October 31, 1950, Serial No. 193,316

6 Claims. (Cl. 260—82.1)

This invention relates to low temperature copolymers and especially to copolymers of unsaturated hydrocarbons with vinyl ethers. Particularly, it relates to compositions made by blending with a suitable oil base stock, a small amount of these novel copolymers. More particularly the invention relates to a process for the preparation of these novel copolymers.

In the past very valuable polymers have been prepared by low temperature polymerization techniques. However, it has been found that most oxygenated compounds, including alcohols, ethers, aldehydes, ketones, and organic acids are fatally poisonous to the catalyst in this polymerization reaction and the presence of even comparatively small amounts of these oxygenated compounds may prevent the polymerization reaction. It has been more recently discovered that vinyl ethers in which the oxygen is linked to the same carbon which forms a terminus for the double linkage, do not exert the powerful poisonous effect upon the catalyst which is characteristic of oxygenated organic compounds generally. In U. S. Patent No. 2,462,703, issued to applicants on February 22, 1949, this novel concept has been taught in reference to copolymeric materials of multiolefins with vinyl ethers having from 3 to 8 carbon atoms per molecule. It has now been found that vinyl ethers and thioethers containing from 3 to 20 carbon atoms may be copolymerized with unsaturated hydrocarbons, particularly olefins and diolefins, to form high molecular weight oil soluble products by the means which will be hereinafter described.

The mixture of vinyl ethers or thioethers and olefinic hydrocarbons may be polymerized over a wide range of proportions, excellent results being obtained with as little as 1% of the olefinic material to as much as 70% thereof, the balance being the vinyl ethers, that is to say, that from 99% to 30% of the vinyl ether may be copolymerized with from 1% to 70% of the olefin. The preferred range of proportions, however, contemplates copolymerizing from 90% to 40% of the vinyl ether with from 10% to 60% of the olefin.

The primary raw material for the present invention is a vinyl ether having the structural formula: $CH_2=CH-X-R$ where R represents an alkyl group having at least one and preferably 6 or more up to about 20 carbon atoms, preferably 8 to 20 carbon atoms, and X represents oxygen or sulfur. Amongst the vinyl ethers that may be used in the present invention are vinyl-cetyl ether, vinyl-octadecyl ether, the corresponding thioethers, and the like.

One high molecular weight vinyl ether that is outstanding for use in the preparation of the copolymers of this invention may be prepared from a mixed alcohol obtained by hydrogenation of coconut oil. Such a product is sold under the name "Lorol" and is a mixture of saturated straight chain alcohols ranging from about 8 to 18 carbon atoms having a major proportion of lauryl alcohol containing 12 carbon atoms. Other related products are made by separating this material, which may be considered as a crude mixture, into several different fractions having a relatively higher proportion of either the higher, lower or medium constituents thereof. The composition of the "Lorol" per se and other related products called "Lorol B" and "Lorol R" is approximately as follows:

*Composition of mixtures of commercial alcohols*

| Component | Lorol, Wt. Percent | Lorol B, Wt. Percent | Lorol R, Wt. Percent |
|---|---|---|---|
| $C_{10}$ Alcohol | 4.0 | 3.0 | 1.0 |
| $C_{12}$ Alcohol | 55.5 | 46.0 | 85.0 |
| $C_{14}$ Alcohol | 22.5 | 24.0 | 13.0 |
| $C_{16}$ Alcohol | 14.0 | 10.0 | 1.0 |
| $C_{18}$ Alcohol | 4.0 | 17.0 | |
| Average Number of Carbon Atoms | 12.8 | 13.5 | 12.2 |

The second raw material may be any olefinic compound, either mono-olefinic or multi-olefinic, conjugated or nonconjugated, having from 4 to 15 carbon atoms per molecule. Operable diolefins include butadiene, isoprene, piperylene, 2-methyl pentadiene, dimethylbutadiene, dimethallyl, myrcene, allo-ocemine, and the like, with butadiene, isoprene and 2-methyl pentadiene being preferred. Isobutylene is the preferred mono-olefin.

The two constituents are admixed, cooled and a Friedel-Crafts catalyst added when the desired temperature has been reacted. The temperature to which the reactants are cooled will range from about $+10°$ C. to as low as $-164°$ C., depending on the particular vinyl ether used. In the case of low molecular weight vinyl ethers that are disclosed in U. S. Patent 2,462,703, referred to above, the extreme temperatures are satisfactory. In the case of higher molecular weight vinyl ethers containing more than 8 carbon atoms per molecule, it has been found that these products can be polymerized only in the temperature range of about $+10°$ C. to $-50°$ C., the preferred range being from $-5°$ C. to $-25°$ C. At temperatures lower than $-50°$ C., vinyl ethers having more than 8 carbon atoms become solid even in the presence of methyl halide or metal halide solvents such as ethyl chloride, methyl chloride, carbon disulfide, and the like. It is apparent, therefore, that they can not be polymerized in alkyl halides or in pure hydrocarbons having boiling points below −80° C.

The polymerization is desirably conducted at suitable low temperature by the application to the reaction mixture of a Friedel-Crafts catalyst preferably in solution. A complex such as the $AlCl_3$-phenol complex may also be used. Any of the materials disclosed by N. O. Calloway in his article on "The Friedel-Crafts Synthesis" printed in the issue of "Chemical Reviews" published for the American Chemical Society at Baltimore in 1935, Volume XVII, No. 3, beginning at page 327, may be used. Boron tri-fluoride and aluminum chloride are particularly effective.

The polymer obtained by the methods described in the present invention may have a Staudinger molecular weight ranging from about 5,000 to 100,000 or 150,000 or higher, a preferred molecular weight being from 6,000 to 14,000. These polymeric materials may also have a wide range of unsaturation depending upon the amount of olefin to be copolymerized. The iodine number will ordinarily be below 50 for the copolymers of invention, and preferably between 1 and 10.

The polymers are especially useful as addition agents for lubricating oils in which they show excellent increase in viscosity indices. Ordinarily they are blended in amounts varying from 0.005% to 20%, preferably from 0.1% to 10%, percentages being by weight, based on the weight of the total composition. They may be used in lubricating oils either alone or in conjuction with dyes, antioxidants, extreme pressure agents, polysilicons, and other polymeric materials.

If insoluble gels are desired for use as solid lubricants, e. g. greases, the unsaturated hydrocarbon may be copolymerized with diethylene glycol divinyl ether using $BF_3$ or $AlCl_3$-methyl chloride catalyst. These gels are useful grease additives and as plasticizers for isobutylene-butadiene type rubber. It has been found that small amounts of the copolymers of this invention are also useful for increasing the tensile strength of paraffin waxes. The incorporation of the copolymers in the wax is a simple matter involving only melting the wax and addition, with stirring, of the copolymer.

The oil base stock in which the copolymer of this invention is to be incorporated, will depend of course upon the intended use; for instance, for a crankcase lubricant for internal combustion engines, mineral lubricating oils are preferred having a viscosity range of about 30 to 200 seconds Saybolt at 210° F. For such purposes it is preferred to use waxy mineral lubricating oils of a paraffinic or highly paraffinic type such as Pennsylvania oils, although other less paraffinic stocks may be used such as Mid-Continent or naphthenic base oils, particularly if a sufficient amount of the copolymer of this invention is incorporated to raise the viscosity index of the oil base stock to at least 100 or higher. The oil base stock may also be a mineral oil of a lower viscosity or boiling range such as a gas oil, mineral seal oil or even kerosene, when such oils, for instance, are intended for use as hydraulic oils, gun recoil oils, etc., or the base stock may be a mineral oil of such similar boiling range, particularly refined for use as a diesel fuel. As the copolymers of this invention have substantial compatibility with fatty oils, the oil base stock in which they are to be used may suitably be a blend of a mineral oil and a fatty oil, or for some particular purpose such as for use as paints or other coating or impregnating compositions, the oil base stock may consist entirely or substantially entirely of a fatty oil or mixture of fatty oils. For certain particular lubricating purposes, such as in the case of steam cylinder lubricants, the copolymers are blended with a heavy mineral oil base stock containing 1 to 10% or so of fatty oils and such blends are suitable for use according to the present invention. Synthetic oils also may be used.

The invention may be more clearly explained with reference to the following examples:

EXAMPLE I

Vinyl isobutyl ether was prepared by allowing vinyl chloride to react with the sodium salt of isobutyl alcohol. It was purified by refluxing over sodium and subsequent distillation. 95 g. of pure liquid isobutylene was placed in a 2-litre Dewar flask to which was added about 45.0 g. of powdered solid $CO_2$. When the temperature of the isobutylene was −78° C., 5 g. of vinyl isobutyl ether was added to the isobutylene. Then about 100 g. of pure propane was added to the olefins in the Dewar flask to act as a diluent. $BF_3$ gas catalyst was then added to the liquid mixture. The reaction was very slow and about 2% by weight of catalyst was required to obtain a yield of 51% by weight. The molecular weight of the copolymer was 12,000. This copolymer was washed with water and dried. Product was then blended in a mineral oil that had 43 S. U. S. at 210° F. and a viscosity index of 112. Blending data are recorded in Table I.

Table I.—V. I. effect of copolymer in mineral oil

| Percent Copolymer | Centistokes Vis. at 100° F. | Centistokes Vis. at 210° F. | V. I. |
|---|---|---|---|
| 1 | 39.02 | 6.37 | 122.0 |
| 3 | 52.50 | 8.16 | 128.0 |
| 6 | 80.14 | 11.68 | 131.6 |

Tests proved that 1% by weight of this copolymer reduced the pour point of the oil from +5° F. to −5° F.

EXAMPLE II 50 g. of 2-methyl pentadiene was placed in a beaker that contained 500 g. of methyl chloride. To this mixture was added 150 g. of isobutylene and 3 g. of the vinyl ether of a mixture of alcohols having an average chain length of 13.5 obtained by hydrogenating coconut oil. To this mixture were added 150 g. of finely powdered carbon dioxide (Dry Ice). When the temperature of the mixture was about −50° C., a boron fluoride-methyl chloride catalyzed solution was added. After about 1% of boron fluoride had been added, a polymerization reaction took place. After washing and weighing the polymer, it was found that the conversion had been approximately 90% by weight. The tripolymer formulated had a Staudinger molecular weight of 35,000. Quality tests indicated that the material could be cured to form synthetic elastomers.

EXAMPLE III 100 g. of vinyl-Lorol B ether was added to 200 g. of methyl chloride at −25° C. To this solution was added 3 g. of isoprene at −25° C. The mixture was held in a 600 ml. Cu beaker and the Cu beaker was cooled externally with excess methyl chloride that was held at −25° C. To this solution, in the Cu beaker, was added, with good agitation, about 1 g. of $BF_3$ in 10 g. of methyl chloride. The temperature of the catalyst solution was −78° C. As the catalyst was added, polymer was formed. The yield of polymer, air dried, and free of catalyst varied from 94% in Experiment A to 99% in Experiment D. In Experiments A and B the purity of the isoprene was 87% and in Experiments C and D the purity of isoprene was 96%. The product was then blended in a mineral oil that had a viscosity at 210° F. of 3.41 centistokes and a viscosity index of 94. The blending data are as follows:

Table II.—V. I. results for vinyl ether copolymers (Vinyl ether of Lorol B alcohol + 3% isoprene made at −25° C. with $BF_3$−methyl chloride catalyst.) (1% $BF_3$ catalyst used.)

| Experiment No. | Molecular Weight of Copolymer | Weight of Copolymer in Oil, percent | Vis. at 100° F. Cs. | Vis. at 210° F. Cs. | V. I. |
|---|---|---|---|---|---|
| Test Oil | | | | 3.41 | 94.0 |
| A | 7,980 | 7.5 | 19.44 | 6.43 | 199.5 |
| B | 8,400 | 7.5 | 20.84 | 6.84 | 196.5 |
| C | 14,400 | 7.5 | 23.46 | 7.62 | 188.1 |
| D | 25,800 | 7.5 | 43.83 | 15.25 | 170.5 |

EXAMPLE IV 25 g. of Lorol B vinyl ether was added to 400 g. of methyl chloride at −25° C. To this solution was added 100 g. of 2-methyl pentadiene. The solution was held to −25° C. A solution of 0.25 g. aluminum chloride, dissolved in 100 g. of methyl chloride, was added. Polymerization took place, the polymerization reaction continuing for about 3 minutes. The resulting polymer of a molecular weight of 10,000 was dried under a slight vacuum at 80° C. for a period of about 3 hours, resulting in a polymer yield of 88%.

Table III.—V. I. results for vinyl ether of Lorol B alcohol and 2-methyl pentadiene

| Weight of Copolymer in Oil | Viscosity at 210° F. S.U.S. | Viscosity Index |
|---|---|---|
| 0 | 46 | 101 |
| 1 | 50 | 117 |
| 3 | 56 | 124 |
| 6 | 65 | 132 |

EXAMPLE V

Example IV was repeated, substituting vinyl isobutyl ether for Lorol B vinyl ether. The reaction conditions were identical. The dry yield of polymer was 91.4%. This product was blended in a mineral oil having a viscosity of 46 S. U. S. at 210° F. and viscosity index of 101. The blend was tested for viscosity and viscosity index with the following results:

Table IV.—V. I. results for 2-methyl pentadiene vinyl isobutyl ether copolymers

| Weight of Copolymer in Oil | Viscosity at 210° F. S.U.S. | Viscosity Index |
|---|---|---|
| 0 | 46 | 101 |
| 1 | 52 | 120 |
| 3 | 59 | 128 |
| 6 | 68 | 136 |

EXAMPLE VI

A tri-polymer of 2-methyl pentadiene, isobutylene, and vinyl isobutyl ether was made, using the reaction conditions of Example IV. The quantities used are as follows: 100 g. 2-methyl pentadiene, 200 g. isobutylene and 25 g. of vinyl isobutyl ether. The dry yield of polymer was 93.1%.

Table V.—V. I. results for tri-polymer of 2-methyl pentadiene isobutylene and vinyl isobutyl ether

| Weight of Copolymer in Oil | Viscosity at 210° F. S.U.S. | Viscosity Index |
|---|---|---|
| 0 | 46 | 101 |
| 1 | 47.5 | 109 |
| 3 | 50 | 117 |
| 6 | 56 | 123 |
| 10 | 66.4 | 129 |

EXAMPLE VII 100 g. of vinyl Lorol B thioether was added to 25 g. of methyl chloride at −25° C. To this solution was added 100 g. of 2-methyl pentadiene. The temperature was held to −25° C. A solution of 25 g. of aluminum chloride, dissolved in 100 g. methyl chloride, was added thereto. Polymerization took place in about 3 minutes and resulted in a copolymer having a molecular weight of 12,000.

EXAMPLE VIII

25% by weight of 2-methyl pentadiene and 75% by weight of vinyl Lorol B ether was polymerized at a temperature of −25° C. using tetrachlorethane and $BF_3$ as a catalyst. 2% by weight of this copolymer was dissolved in a Mid-Continent paraffinic base oil having a viscosity of 44 S. U. S. at 210° F., a viscosity index of 101 and pour point of 130° F. The blend containing this copolymer showed an ASTM pour point of −15° F.

EXAMPLE IX 25 g. of vinyl isopropyl thioether and 1.5 g. of 2-methylpentadiene were charged to a 200 ml. Pyrex beaker. To the mixture was added 100 g. of ethyl chloride and 200 g. of powdered $CO_2$. After the temperature of the liquid had been lowered to about −78° C., 3 g. of $BF_3$·phenol complex catalyst containing 1.5 g. of $BF_3$ was added with agitation of the mixture. A polymerization reaction took place at once. The copolymer was removed, washed with hot water to remove catalyst, and dried for 5 hours at 70° C. under 24 inches of vacuum. The yield of copolymer was 84.8%. The copolymer was slightly dark in color (tacky), and had a molecular weight of about 8,000 Staudinger. This polymer was quite soluble in a mineral oil of 38 S. U. S. at 210° F. and a viscosity index of 20. It was found that 3% by weight of this copolymer increased the viscosity of the oil from 38 S. U. S. at 210° F. to 44.6 S. U. S. at 210° F., and the viscosity index from 20 to 96.

EXAMPLE X 50 g. of vinyl 2-ethylhexyl ether and 1.5 g. of 2-methylpentadiene were charged to a 400 ml. Pyrex beaker. To the solution was added 100 g. of methyl chloride and 100 g. of powdered $CO_2$. When the temperature of the liquid mixture was −78° C., about 5 g. of an $AlCl_3$·ethyl chloride catalyst solution containing 0.5 g. of $AlCl_3$ was added. A polymerization reaction took place as the catalyst was added. The washed, white copolymer had a molecular weight of 9,000 and it was quite elastic and tacky. Yield of copolymer, with iodine number of 1.3 was 77.8%. This copolymer was soluble in synthetic ester lubes as well as in mineral oil.

The copolymer of Example X was blended with the iso-octyl alcohol diester of sebacic acid. Viscosity improvement is shown in Table VI below.

*Table VI*

|  | Viscosity at 210° F. (Centistokes) | V. I. |
|---|---|---|
| Base Oil (di-2-ethyl hexyl sebacate) | 3.3 | 154 |
| Base Oil+2% of copolymer of Example X | 5.5 | 192 |

EXAMPLE XI 80 g. of vinyl 2-ethylhexyl ether and 20 g. of 2-methyl pentadiene were charged to a 500 ml. Pyrex beaker containing 100 g. of ethyl chloride. To the mixture was added 100 g. of powdered $CO_2$. When the temperature of the mixture had been lowered to −78° C., 3 g. of $AlCl_3$ in solution in ethylchloride was added. A rapid polymerization took place. The copolymer was washed with water and oven dried under vacuum at 70° C. A yield of 88% of a copolymer of 22,000 molecular weight was obtained.

This copolymer was blended with a melted paraffin wax in 2% concentration and increased the tensile strength of the wax as set out in Table VII below.

*Table VII*

|  | Melting Point (° F.) | Tensile Strength (lbs./sq. in.) |
|---|---|---|
| Paraffin wax alone | 132 | 220 |
| Paraffin wax plus 2% of copolymer of Example XI | 132 | 325 |

To summarize briefly, this invention relates to lubricant additives which are prepared by reacting from 99% to 30% of a vinyl ether or a vinyl thioether containing from 10 to 22 carbon atoms per molecule with from 1% to 70% of an unsaturated aliphatic hydrocarbon containing from 4 to 12 carbon atoms per molecule selected from the class consisting of olefins and multiolefins in the presence of a Friedel-Crafts catalyst at a temperature within a range of from 10° C. to −50° C. for a period of time sufficient to give a polymeric material having a molecular weight within a range of from 5,000 to 30,000. This case is a continuation-in-part of Serial No. 67,066, now abandoned, filed December 23, 1948 for the same inventors.

What is claimed is:

1. A process for the preparation of lubricating oil additives which comprises copolymerizing from about 90% to 30% of the vinyl ether of a mixture of alcohols having an average number of carbon atoms of about 13.5 obtained by the hydrogenation of coconut oil with from about 10% to about 70% by weight of a conjugated hydrocarbon of a total of from 5 to 6 carbon atoms having 4 to 5 carbon atoms in a straight chain and having a methyl group in the 2-position at a temperature of about −25° C. in the presence of a methyl chloride solution of $AlCl_3$ for a period of time sufficient to give an oil soluble copolymer of a molecular weight of about 5,000 to 30,000.

2. A process in accordance with claim 1 wherein said conjugated hydrocarbon is isoprene.

3. A process in accordance with claim 1 wherein said conjugated hydrocarbon is 2-methyl pentadiene.

4. A lubricating oil additive material consisting essentially of a material prepared by copolymerizing from about 90% to 30% of the vinyl ether of a mixture of alcohols having an average number of carbon atoms of about 13.5 obtained by the hydrogenation of coconut oil with from about 10% to about 70% by weight of a conjugated hydrocarbon of a total of from 5 to 6 carbon atoms having 4 to 5 carbon atoms in a straight chain and having a methyl group in the 2-position at a temperature of about −25° C. in the presence of a methyl chloride solution of $AlCl_3$ for a period of time sufficient to give an oil soluble copolymer of a molecular weight of about 5,000 to 30,000.

5. An additive according to claim 4 wherein said conjugated hydrocarbon is isoprene.

6. An additive according to claim 4 wherein said conjugated hydrocarbon is 2-methyl pentadiene.

References Cited in the file of this patent

UNITED STATES PATENTS

| Number | Name | Date |
|---|---|---|
| 2,020,703 | Schumann et al. | Nov. 12, 1935 |
| 2,125,649 | Reppe et al. | Aug. 2, 1938 |
| 2,462,703 | Young et al. | Feb. 22, 1949 |
| 2,513,820 | Schildknecht | July 4, 1950 |

FOREIGN PATENTS

| Number | Country | Date |
|---|---|---|
| 834,018 | France | Nov. 9, 1938 |
| 445,434 | Great Britain | Apr. 9, 1936 |
| 598,914 | Great Britain | Mar. 1, 1948 |